United States Patent
Troesch et al.

(10) Patent No.: US 12,554,948 B2
(45) Date of Patent: Feb. 17, 2026

(54) METHOD FOR VALIDATING RADIO FREQUENCY IDENTIFICATION NUMBER

(71) Applicant: Avid Identification Systems, Inc., Norco, CA (US)

(72) Inventors: Peter Troesch, Laguna Niguel, CA (US); Martin S. H. Ma, Foothill Ranch, CA (US); Timothy J. Ward, Mira Loma, CA (US)

(73) Assignee: AVID Identification Systems, Inc., Norco, CA (US)

( * ) Notice: Subject to any disclaimer, the term of this patent is extended or adjusted under 35 U.S.C. 154(b) by 147 days.

(21) Appl. No.: 16/788,036

(22) Filed: Feb. 11, 2020

(65) Prior Publication Data

US 2021/0248328 A1 Aug. 12, 2021

(51) Int. Cl.
*G06K 7/08* (2006.01)
*G06K 7/10* (2006.01)
*G06K 19/14* (2006.01)

(52) U.S. Cl.
CPC ......... *G06K 7/086* (2013.01); *G06K 7/10297* (2013.01); *G06K 19/145* (2013.01)

(58) Field of Classification Search
CPC ............... G06K 19/145; G06K 7/0102; G06K 7/10297; G06K 7/086; H04L 9/00; H04L 9/006; H04L 9/0825; A01K 11/00
See application file for complete search history.

(56) References Cited

U.S. PATENT DOCUMENTS

| | | | |
|---|---|---|---|
| 9,298,756 B1 * | 3/2016 | Johnson | G06F 16/9554 |
| 9,489,785 B2 * | 11/2016 | Klammer | H04L 63/06 |
| 9,911,018 B1 * | 3/2018 | Heinrich | H04L 9/0866 |
| 10,007,815 B2 * | 6/2018 | Barbaric | G06K 19/0723 |
| 10,127,413 B2 | 11/2018 | Mizuno | |
| 11,196,611 B1 * | 12/2021 | Patel | G06F 18/22 |
| 11,361,174 B1 * | 6/2022 | Robshaw | H04L 9/3242 |
| 11,797,813 B1 * | 10/2023 | Ensworth | G06K 7/0008 |
| 11,901,983 B1 * | 2/2024 | Mansour | H04W 88/06 |

(Continued)

FOREIGN PATENT DOCUMENTS

| | | |
|---|---|---|
| CN | 103516517 A | 1/2014 |
| KR | 10-2010-0024116 | 3/2010 |

(Continued)

OTHER PUBLICATIONS

PCT International Search Report and Written Opinion in International Appln. No. PCT/US2021/017278, dated Jun. 2, 2021, 9 pages.

(Continued)

*Primary Examiner* — Daniel I Walsh
(74) *Attorney, Agent, or Firm* — Fish & Richardson P.C.

(57) ABSTRACT

Methods for producing and validating RFID transponders (e.g., ISO 11784/11785 compliant transponders) with identification number authentication capabilities. A signature indicator and a partial-signature trailer are introduced to the ISO telegram. An encrypted signature or partial signature is introduced to the internal memory of ISO compliant transponders. The encrypted signature can prevent fraudulent duplications of ISO 11784/11785 transponders by allowing users to securely validate the transponders' authenticity.

14 Claims, 9 Drawing Sheets

(56) References Cited

U.S. PATENT DOCUMENTS

| | | | |
|---|---|---|---|
| 2003/0112972 A1* | 6/2003 | Hattick | H04L 9/0656 380/46 |
| 2004/0036626 A1* | 2/2004 | Chan | G06K 19/0717 374/E1.004 |
| 2005/0233696 A1* | 10/2005 | Friedrich | G06K 7/0008 342/51 |
| 2005/0289083 A1* | 12/2005 | Ngai | H04L 9/3247 705/67 |
| 2006/0000420 A1* | 1/2006 | Martin Davies | A61B 5/1038 119/174 |
| 2006/0269062 A1* | 11/2006 | Mihcak | G06K 19/086 380/255 |
| 2008/0069347 A1* | 3/2008 | Brown | H04L 9/3066 380/45 |
| 2008/0303667 A1* | 12/2008 | Rehman | G06F 21/31 340/572.1 |
| 2010/0039268 A1* | 2/2010 | Huther | G06Q 50/40 340/573.1 |
| 2010/0052869 A1* | 3/2010 | Stewart | G06K 19/0709 257/679 |
| 2010/0306112 A1 | 12/2010 | Tseng | |
| 2010/0308978 A1* | 12/2010 | Brown | H04L 9/3213 340/10.42 |
| 2012/0160921 A1* | 6/2012 | Tanner | G06K 19/07345 235/492 |
| 2014/0266591 A1* | 9/2014 | Klammer | G06F 21/44 340/5.65 |
| 2015/0090789 A1* | 4/2015 | Kastner | H01Q 1/2216 343/742 |
| 2015/0134552 A1* | 5/2015 | Engels | G06Q 10/087 705/318 |
| 2015/0317899 A1* | 11/2015 | Dumbauld | G16H 40/40 340/540 |
| 2016/0094341 A1 | 3/2016 | Hinz et al. | |
| 2016/0226665 A1* | 8/2016 | Wuidart | H04W 12/069 |
| 2017/0017874 A1* | 1/2017 | Park | G06K 19/07796 |
| 2017/0018140 A1* | 1/2017 | Yamaguchi | A63F 1/067 |
| 2017/0200154 A1* | 7/2017 | Dubreucq | G06Q 20/401 |
| 2017/0206532 A1* | 7/2017 | Choi | G06Q 30/02 |
| 2017/0317709 A1* | 11/2017 | Prendergast | H04B 1/401 |
| 2017/0364905 A1* | 12/2017 | Hart | G06K 19/07749 |
| 2018/0026795 A1 | 1/2018 | Klammer et al. | |
| 2018/0129835 A1 | 5/2018 | Mizuno | |
| 2018/0205714 A1* | 7/2018 | Rosati | H04L 63/0428 |
| 2019/0026749 A1* | 1/2019 | Gao | G06K 7/10297 |
| 2019/0082564 A1* | 3/2019 | Jang | H02J 50/12 |
| 2019/0122320 A1* | 4/2019 | Mundell | H04L 63/126 |
| 2019/0325178 A1* | 10/2019 | Nam | G07F 17/3241 |
| 2019/0367239 A1* | 12/2019 | Camenisch | H04L 9/0894 |
| 2019/0372775 A1* | 12/2019 | Camenisch | H04L 9/3247 |
| 2020/0028249 A1* | 1/2020 | Terashita | H01Q 1/521 |
| 2020/0169294 A1* | 5/2020 | Weidinger | G06Q 20/35765 |
| 2020/0342976 A1* | 10/2020 | Canady | A61B 90/98 |
| 2020/0373654 A1* | 11/2020 | Shukutani | H01Q 1/36 |
| 2021/0248328 A1* | 8/2021 | Troesch | G06K 19/145 |
| 2021/0319193 A1* | 10/2021 | Elabd | G06K 19/0723 |
| 2022/0343089 A1* | 10/2022 | Turner | G06K 7/10475 |
| 2024/0378683 A1* | 11/2024 | Gorski | G06Q 20/36 |
| 2025/0087874 A1* | 3/2025 | Ieda | H01Q 21/28 |
| 2025/0240170 A1* | 7/2025 | Barnes | H04L 9/3247 |

FOREIGN PATENT DOCUMENTS

| | | | | |
|---|---|---|---|---|
| TW | 201633211 | 9/2016 | | |
| WO | WO 2010024509 | 3/2010 | | |
| WO | WO-2025159775 A2 * | 7/2025 | | H04L 9/0891 |
| WO | WO-2025177149 A1 * | 8/2025 | | H04L 65/1073 |

OTHER PUBLICATIONS

Extended European Search Report in European Appln No. 21753602.8, dated Sep. 18, 2023, 5 pages.

Mk, Jordi Jofre. "NFC for Consumables and Accessories." NXP Community. Published Feb. 23, 2018. Last modified on Jul. 31, 2019. Retrieved from the internet on Nov. 11, 2019. Retrieved from URL<https://community.nxp.com/docs/DOC-340283>. 10 pages.

Lin et al., "Computing-Commission Signature and its Application in RFID Authentication," Electronic Product Reliability and Environmental Testing, Feb. 20, 2015, 1-15.

Seike et al., "Blockchain-Based Ubiquitous Code Ownership Management System without Hierarchical Structure," In2018 IEEE SmartWorld, Ubiquitous Intelligence & Computing, Advanced & Trusted Computing, Scalable Computing & Communications, Cloud & Big Data Computing, Internet of People and Smart City Innovation, Dec. 6, 2018, 271-276.

\* cited by examiner

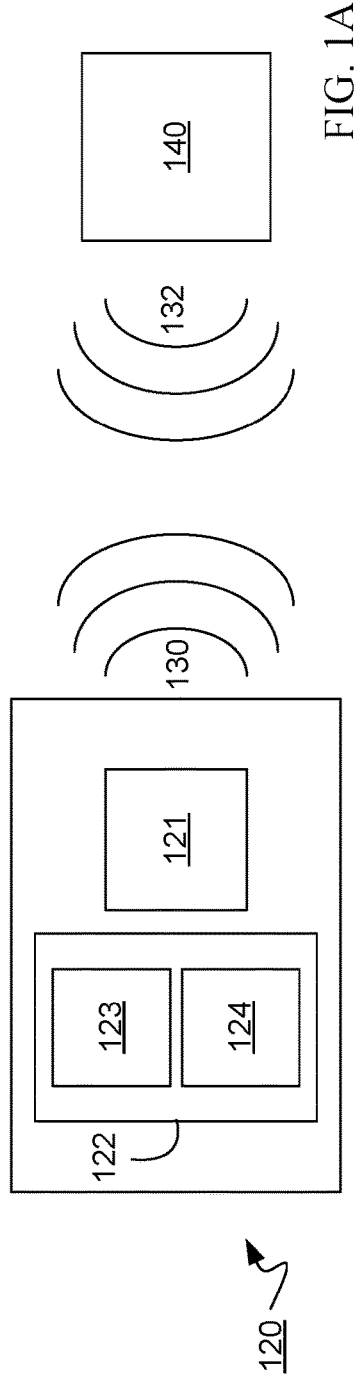
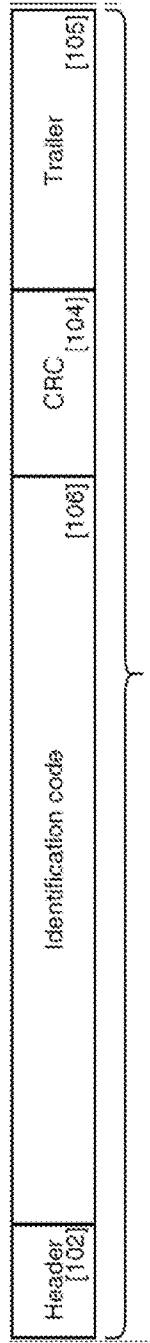
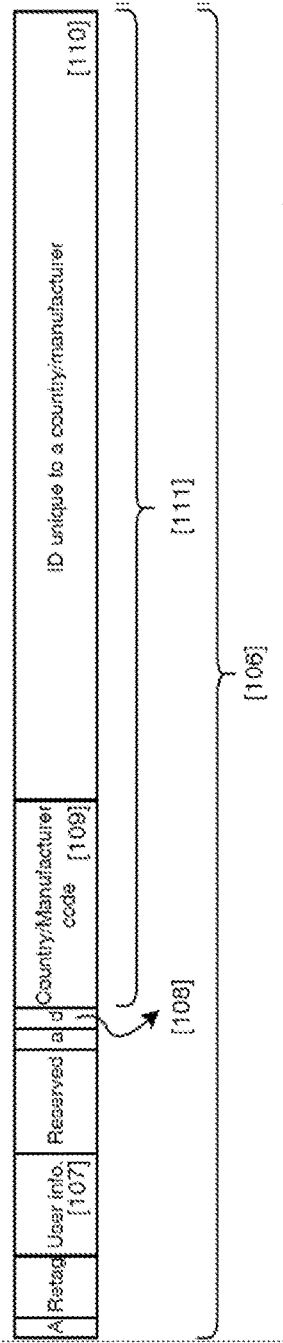
FIG. 1A
FIG. 1B (PRIOR ART)
FIG. 1C (PRIOR ART)

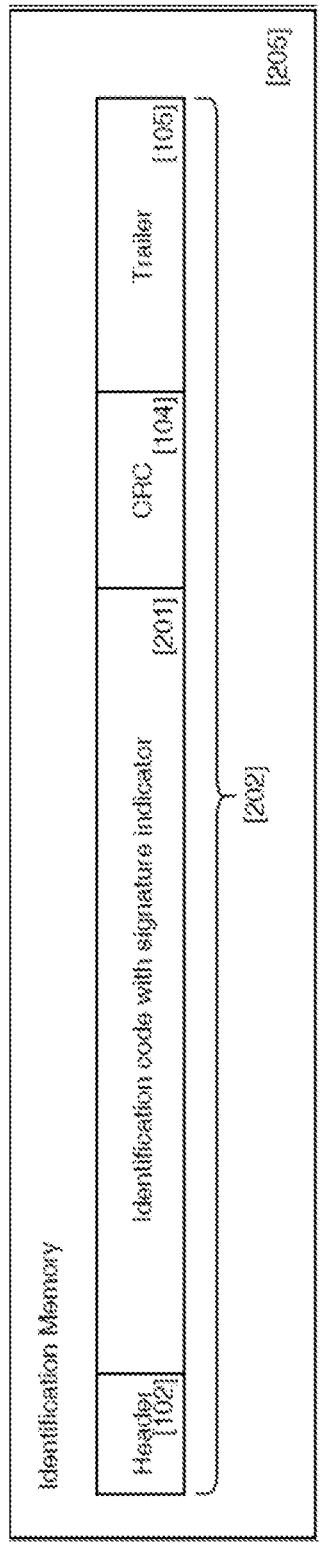
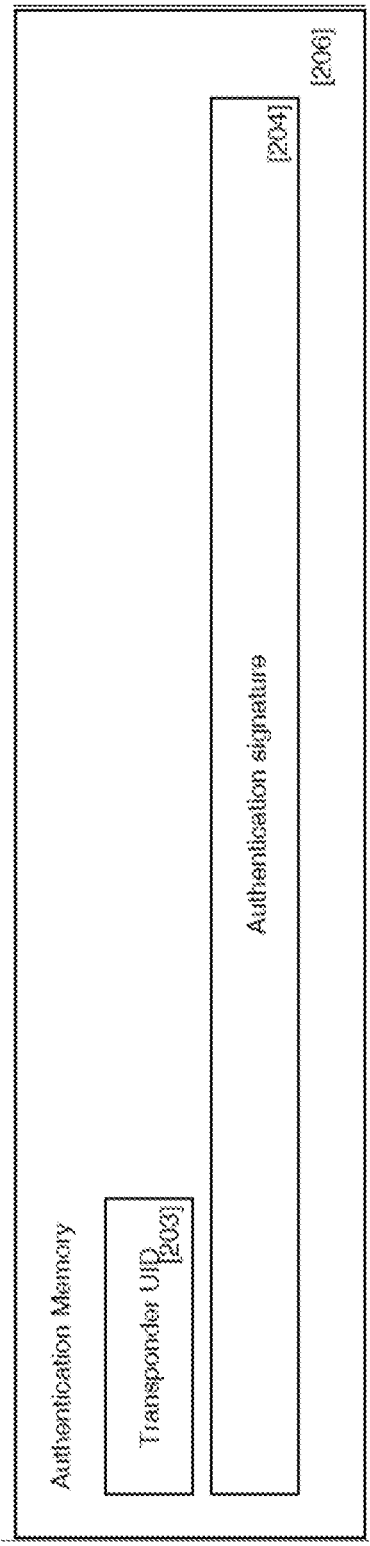
FIG. 2A
FIG. 2B

METHOD FOR VALIDATING RADIO FREQUENCY IDENTIFICATION NUMBER

TECHNICAL FIELD

Generally, this specification relates to a method for producing an RFID transponder and in particular to an RFID transponder with authentication data. Additionally, the specification relates to a method for authenticating an RFID with a standalone RFID scanner. More specifically, this disclosure presents a method to produce and validate authenticated ISO 11784/11785 transponders, for example.

BACKGROUND

The ISO 11784/11785:1996 standards specify the radio frequency identification (RFID) signal and data structure for animal identification. The standards lack the specifications for authentication and leave the identification numbers vulnerable to cloning. The existing ISO 11784/11785 radio frequency identification technologies rely on the manufacturers to guarantee the uniqueness of each animal identification number.

However, with the availability of programmable transponders, the animal identification numbers can easily be cloned by a standard RFID programmer. While existing technologies like NXP's Originality Signature store and retrieve encrypted signatures within the transponder, they use manufacturer specific transponder hardware logic and scanner software.

SUMMARY

This specification describes means for manufacturers to produce RFID transponders, e.g., ISO 11784/11785 compliant transponders, with authentication signature using commercially-available transponders and RFID programmers. This specification also describes methods to validate the authentication signature using RFID scanners capable of reading the internal memory of a transponder, thereby authenticating the transponder.

In general, one innovative aspect of the subject matter described in this specification can be embodied in a transponder, including: a radio frequency (RF) transceiver; and memory in communication with the RF transceiver, the memory storing data retrievable by a scanner via the RF transceiver. The memory includes: (i) field-programmable memory including a default telegram transmitted by the transponder automatically upon activation of the transponder by the scanner; and (ii) field-programmable memory including a signature generated with the default telegram, the signature being transmitted by the transponder upon receipt of a memory-read signal.

Implementations of the transponder can include one or more of the following features and/or features of other aspects. For example, the memory can include read-only memory comprising a unique identification (UID) code independently established by a third party. The signature can be generated with both the UID code and the default telegram. The UID code can be transmitted by the transponder upon receiving a UID-read signal.

In some implementations, the default telegram includes an identification code and a signature indicator.

The transponder can be compliant with ISO 11784/11785 code structures.

In another aspect, the subject matter features a passive integrated transponder (PIT) tag including the transponder.

In yet another aspect, the subject matter features a collar tag including the transponder.

In general, another innovative aspect of the subject matter described in this specification can be embodied in a method performed by a scanner for validating a transponder, the transponder including memory storing data retrievable by the scanner, the data having a default telegram and a signature. The method includes: retrieving the default telegram by activation of the transponder with a radio signal (RF) signal from the scanner; retrieving at least a portion of the signature by transmitting a memory-read signal from the scanner to the transponder; and computationally authenticating the signature based on the default telegram.

Implementations of the method can include one or more of the following features and/or features of other aspects. For example, the memory can include a unique identification (UID) code independently established by a third party and the method can further include retrieving the UID code by transmitting the memory-read signal from the scanner to the transponder. The signature can be computationally authenticated based on the default telegram and the UID code. The signature can be generated with the UID code and the default telegram.

The memory-read signal can be transmitted by the scanner after retrieving the default telegram. The scanner can transmit the memory-read signal in response to confirming a signature indicator contained in the default telegram.

The entire signature can be retrieved upon transmitting the memory-read signal from the scanner to the transponder. In certain implementations, a portion of the signature is retrieved with the default telegram.

The method can include validating the transponder upon authentication of the signature.

The transponder can be compliant with ISO 11784/11785 code structures.

The transponder can reside within an animal during retrieval of the default telegram and the signature. The method can include identifying the animal after authenticating the signature.

In general, another innovative aspect of the subject matter described in this specification can be embodied in a method for programming a transponder including memory, the method including: generating a default telegram; generating a signature based on the default telegram; and writing the signature and the default telegram to the memory of the transponder.

Implementations of the method can include one or more of the following features and/or features of other aspects. For example, the memory can include a unique identification (UID) code and the method further comprises receiving the UID code from the transponder. The signature can be generated based on both the UID code and the default telegram.

The transponder can be compliant with ISO 11784/11785 code structures.

Accordingly, the disclosed method includes several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

Many systems are designed around the capabilities of RFID transponders, such as licensing and registration of animals, certification of veterinary health certificates, time and attendance systems, and access control, each of which generally implicitly rely of the integrity of the transponder identification code.

The secured transponder technologies disclosed herein advance and promote the objects of identification by frustrating illicit duplication or counterfeiting of transponders placed into service and further strengthens such systems by creating accountability and preventing repudiation of a transponder.

Among other advantages, the secured transponder technologies disclosed herein can advance identification, e.g. animal identification, technologies by enabling signature validation for transponder authentication. In some implementations, the transponders can be used as certificates of authenticity, e.g. in a similar manner to those used for luxury watches, art, memorabilia, etc.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a schematic diagram showing aspects of a RFID transponder.

FIG. 1B shows a conventional 128-bit ISO Full Duplex transmission (FDX) telegram defined in ISO 11785:1996.

FIG. 1C shows a conventional 64-bit identification code data content defined in ISO 11784:1996, ISO 11784 Amd.1: 2004, and ISO 11784 Amd.2:2010.

FIGS. 2A-2B show aspects of example memory content of the disclosed transponder featuring a signature indicator included with identification data and an authentication signature included entirely with authentication data.

Like reference numbers and designations in the various drawings indicate like elements.

DETAILED DESCRIPTION

Figure 3:
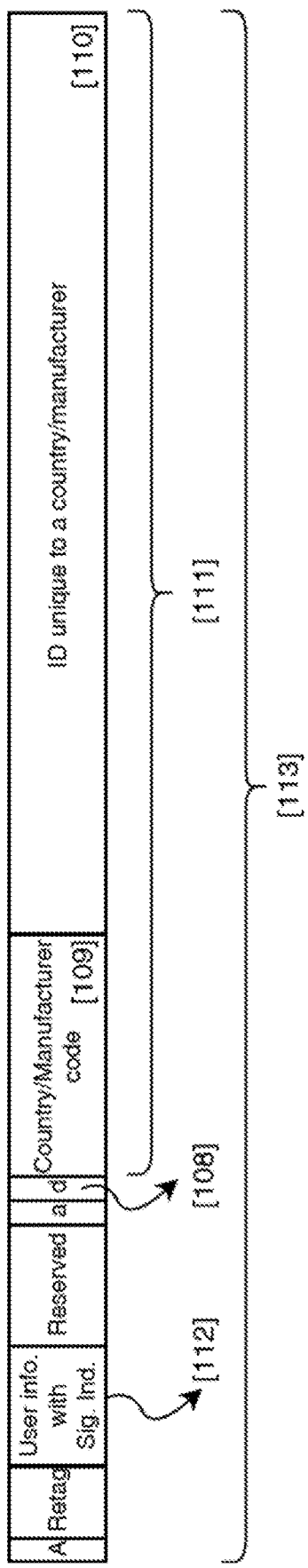
FIG. 3 shows identification code data compliant with ISO 11784 that includes a signature indicator.

In general, the disclosed technologies relate to a method and system to prevent fraudulent production of a radiofrequency identification (RFID) transponder. For example, the technology can include a signature indicator in the default-read telegram and storing a read-only authentication signature in the internal memory of the transponder. The RFID can be compliant with an ISO standard, such as the ISO 11784/11785 standard. Among other uses, the transponders can be used for animal identification. The transponders can be embedded or attached to a variety of articles, depending on the end use. For example, the transponder can be embedded in a tag, e.g., for attaching to an animal, such as a passive integrated transponder (PIT) tag or a collar tag. In some embodiments, the transponder can be enclosed in a nail or attached to an adhesive substrate.

An example RFID transponder for implementing the method is shown in FIG. 1A. Here, transponder 120 includes a radio frequency transceiver 121 and a memory 122. RF transceiver 121 generally includes control circuitry (e.g., composed of one or more integrated circuits) and an antenna. Memory 122 includes internal memory 123 (e.g., read only memory) and field-programmable memory 124. Memory 122 is in communication with RF transceiver 121, which receives RF signals 132 (e.g., from an RF scanner 140) and transmits RF signals 130 (e.g., to RF scanner 140). Generally, the transmitted RF signals 130 includes information stored in memory 122 that uniquely identifies transponder 120. The information includes a default telegram stored in field-programmable memory 124 that is transmitted by transponder 120 automatically upon activation by transponder 140. Field-programmable memory 124 also includes a signature generated using, at least, a portion of the default telegram (e.g., with just part of the default telegram or with the entire default telegram). Internal memory 123 can store information such as a unique identification (ID) code independently established by a third party, such as a manufacturer of the integrated circuit of the memory.

In general, the signature can adopt any public-private key encryption methods, such as AES, ECDSA, and RSA.

Examples of specific protocols for partitioning and retrieving information stored, including the signature, in memory 122 are presented below. While the examples use the ISO 11784/11785 standard, more generally, the innovative concepts disclosed can be applied to other standards too.

FIGS. 1B and 1C show a conventional 128-bit ISO FDX telegram 101 defined in ISO 11785:1996 and a conventional 64-bit identification code data content 106 defined in 11784: 1996, 11784 Amd. 1:2004, and 11784 Amd. 2:2010, respectively. Identification code 106 is part of the data making up telegram 101.

An index used in FIG. 1C is provided in Table 1.

TABLE 1

| Field | Field Name | Field value | Meaning |
| --- | --- | --- | --- |
| A | Non-animal identification | 0 | Animal |
|  |  | 1 | Non-animal |
| a | Reference to user data inside (RUDI) | 0 | No user data |
|  |  | 1 | Advanced transponder |
| D | Data in telegram trailer | 0 | ID-only |
|  |  | 1 | Data in telegram trailer |

Figure 6:
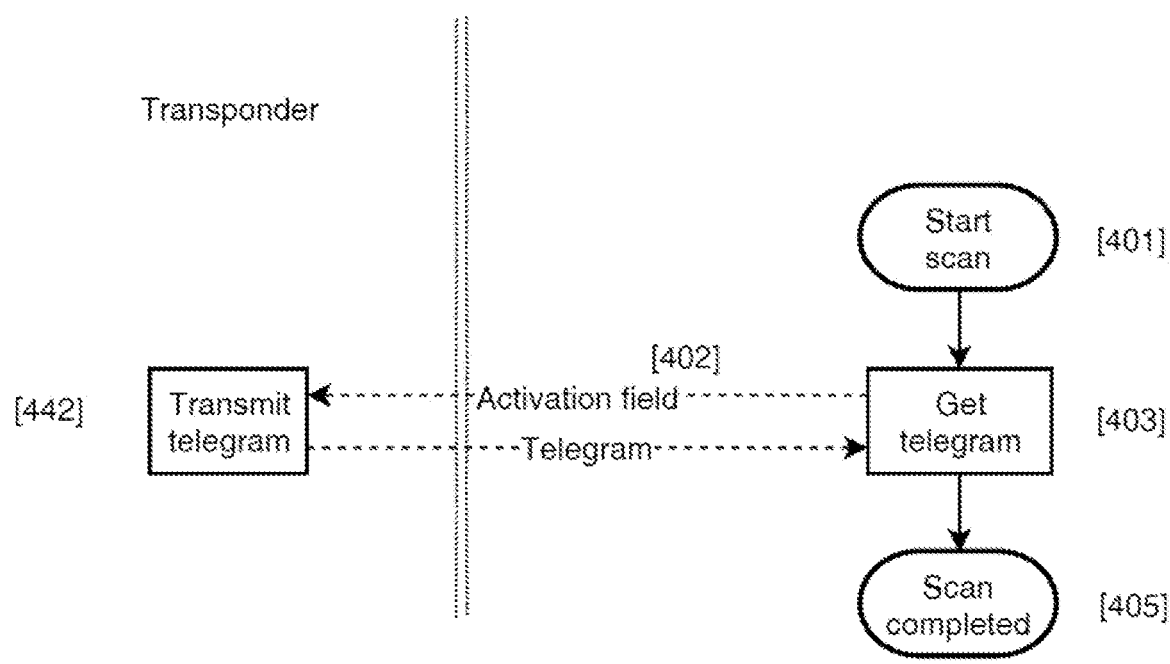
FIG. 6 is a flowchart of a scanning process of a conventional ISO transponder.

Turning now to RFID tags that include a signature for authentication, generally the transponder memory is partitioned into two segments: identification data and authentication data. Referring to an example in FIGS. 2A and 2B, identification memory 205 stores an ISO 11784/11785 telegram and its content is continuously transmitted by the transponder whenever the transponder is activated. The authentication memory 206 stores the authentication data and its content is only transmitted by the transponder, in general, once every time a memory read command is received by the transponder. In certain instances, multiple read commands may be needed to retrieve a complete authentication. A conventional scanner without authentication capabilities will follow the conventional identification process flow shown in FIG. 6 and only have access to the ISO telegram stored in the identification memory 205.

Figure 7:
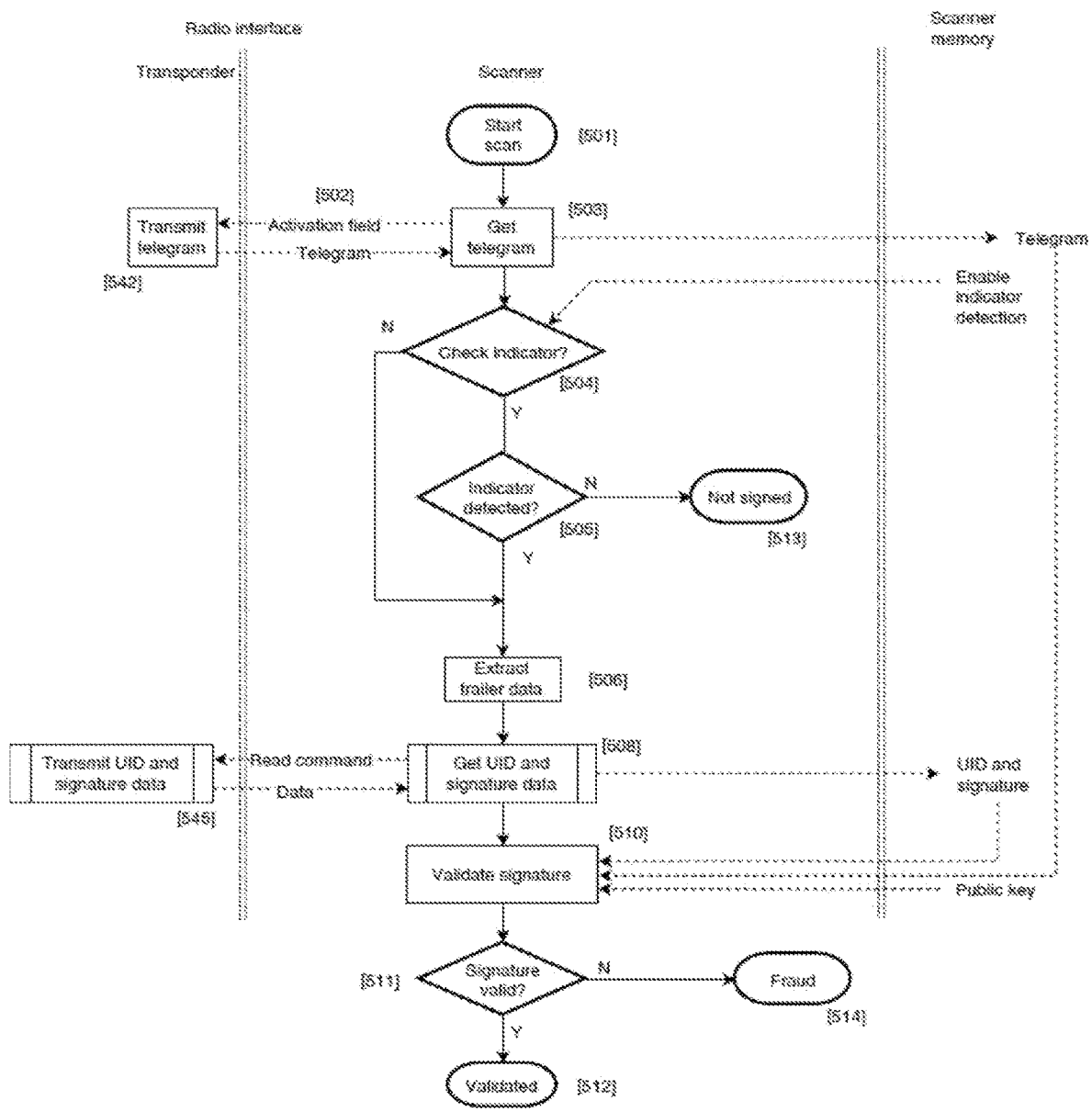
FIG. 7 is a flowchart of an example scanning process of the disclosed ISO transponder.

In the example implementation shown in FIGS. 2A-2B, the signature 204 is stored in a baseline configuration. In the baseline signature storage format shown in FIG. 2B, the complete signature 204 is stored in the internal memory 206 of the transponder with no part of it appearing in the telegram 205 shown in FIG. 2A. To retrieve the complete signature 204, the RFID scanner has to transmit memory read commands 508 to the transponder, as shown in FIG. 7.

Referring to FIG. 3, for the implementation shown in FIGS. 2A-2B, a signature indicator 112 can be introduced to the user information field 112 of an identification code 113 specified in the ISO 11784:1996/Amd.1:2004 standard.

Figure 4A:
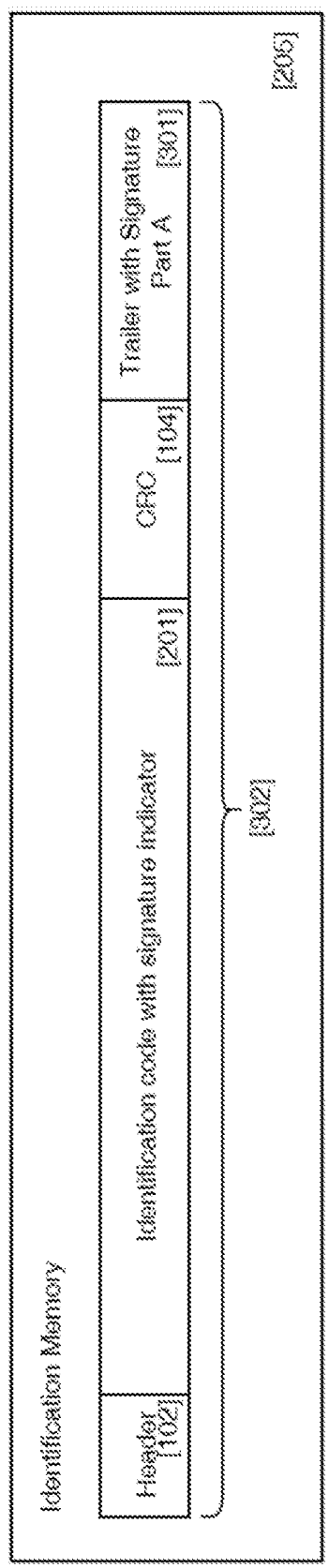
FIGS. 4A-4B show aspects of example memory content of the disclosed transponder with a partial signature trailer in the identification data and part of the signature is included with authentication data.
Figure 4B:
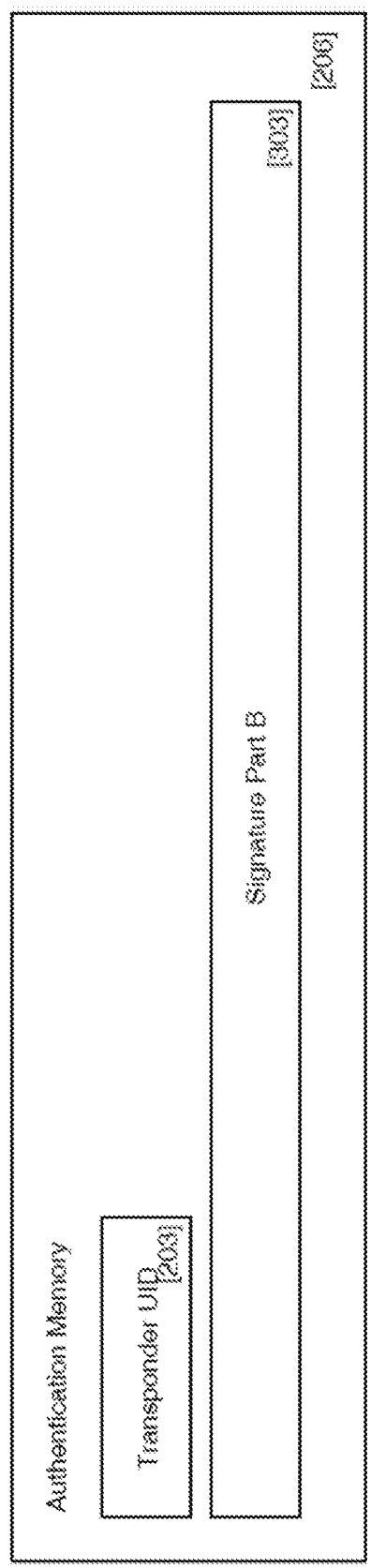

In some implementations, at least part of a signature can be stored as part of the identification data. For example, referring to FIGS. 4A-4B, a signature 301 & 303 is stored in a partial signature trailer configuration. In the partial-signature trailer format shown here, a portion of the signature is stored in the telegram trailer 301. The telegram trailer 301, shown in FIG. 4A, is transmitted as a part of the ISO 11784/11785 telegram 302. All standard conforming scanners can read and collect this part of the signature during the conventional transponder scanning process shown in FIG. 6. In particular, at the start of a scan (401), the scanner send an activation signal (402) which causes the transponder to transmit the default telegram 442. The scanner receives and reads the telegram (403). This completes the scan (405). The transponder is switched off when the activation field is no longer present.

The remaining portion of the signature 303 is stored in the internal memory 206 of the transponder. To retrieve the complete signature 301 & 303, the RFID scanner has to transmit memory read commands 508 to the transponder, as shown in FIG. 7.

Figure 5:
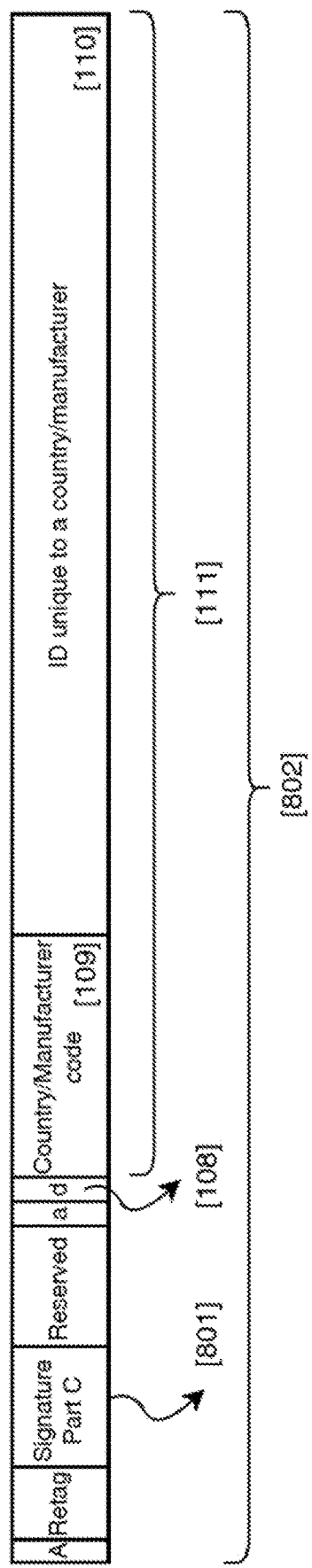
FIG. 5 shows identification code data compliant with ISO 11784 that includes part of a signature.

While the foregoing example features a portion of the signature is stored in the telegram trailer 301, other configurations are possible. For example, in some embodiments, part of the signature can be stored in the telegram's identification code. FIG. 5 shows an implementation of a telegram's identification code 802 in which part of the signature is included in user information field 801. In some embodiments, an authentication signature generated from the transponder UID 203 and the animal identification number 111 is introduced to every transponder for authentication. A scanner can validate the authenticity of the signature by using the animal identification number 111, a known public key, and the transponder UID 203 as the input parameters to the validation function.

As further shown in FIG. 7, to authenticate a signed transponder, the RF scanner has to perform additional data extraction 505, 506 and transponder interrogation 508. After completing the operations 501, 502, 503, and 542 corresponding to the identification process shown in FIG. 6 (i.e., operations 401, 402, 403, and 442), the scanner attempts to detect 505 a signature indicator 112 in the telegram 202/302's user information field 107. The absence 505N of a signature indicator 112 immediately categorizes 513 the transponder as "not signed". No authentication is possible for such transponders. This is the case for existing conventional ISO transponders in the market.

If a signature indicator 112 is detected 505Y, the scanner will extract 506 the partial signature from the telegram trailer 301 for signed transponders using the partial signature trailer 301 storage configuration. Afterwards, the scanner reads the transponder UID 203 and the remaining signature data 204, 303 from the transponder by sending multiple memory read commands 508. When both the transponder UID 203 and the complete signature 204, 301 & 303 are collected via UID and signature data transmission 545 from the transponder, the scanner can validate 510, 511 the signature stored in the transponder using the public key, the identification code 111, and the transponder UID 203 as decryption parameters. The validation process described above is shown in FIG. 7. When validating, the UID and signature read orders can be interchanged.

Figure 8:
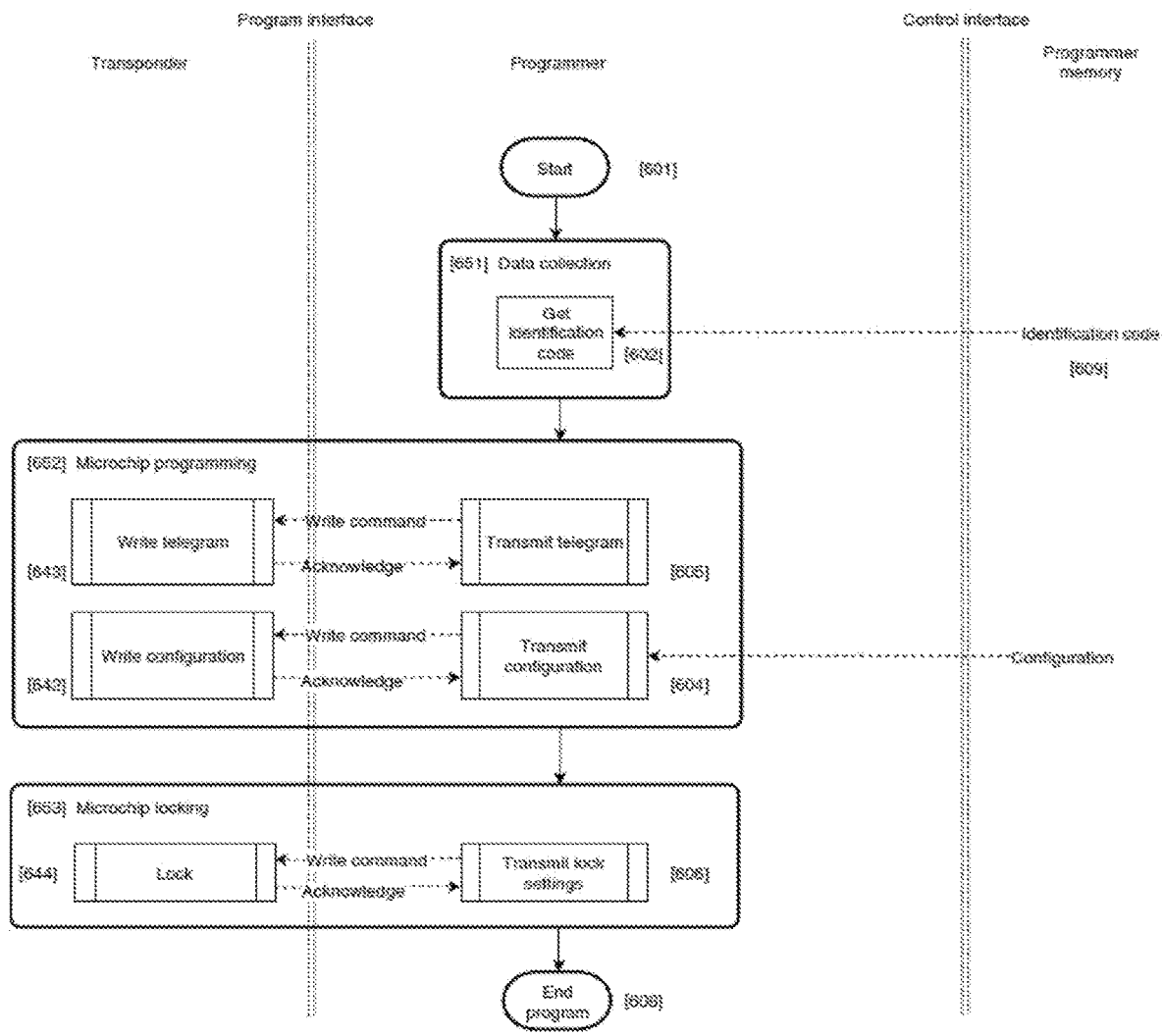
FIG. 8 is a flowchart of a programming process of a conventional ISO transponder.

FIG. 8 is a flowchart of a programming process of a conventional ISO transponder. To produce the conventional transponder, an ISO 11784/11785 compliant programmer starts 601 with data collection 602 including obtaining an identification code 609 from programmer memory. The programmer writes the transponder configuration 604, the telegram 605, and the transponder lock 606 in the sequence to transponder in a telegram write (643), configuration write (642) and lock (644) steps, as shown in FIG. 8. The production of signed transponders requires additional steps to interrogate the transponder 704 and compute the signature 706.

Figure 9:
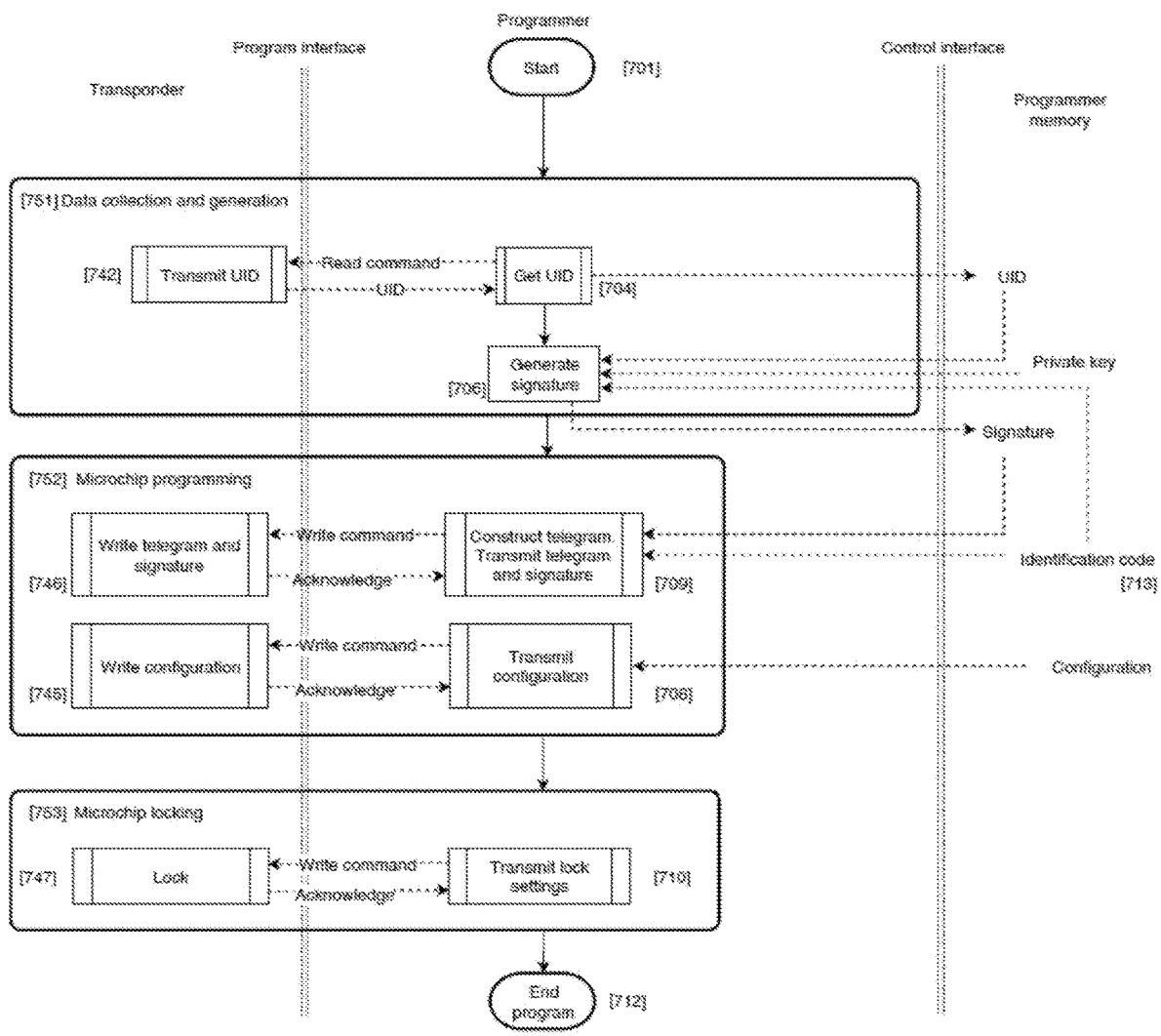
FIG. 9 is a flowchart of an example programming process of the disclosed ISO transponder.

FIG. 9 is a flowchart of a programming process of a signed transponder, in accordance with the disclosed technologies. For a signed transponder, the programmer needs the additional steps of reading the UID of the transponder 704 and generating the authentication signature 706 before programming both the telegram and the signature 709. For a public-key based authentication signature, the programmer uses a private key, the transponder UID 203, the identification code 111, and a random salt as parameters for signature generation 706. With the signature generated, the programmer can then write the configuration 708, the telegram 709, the signature 709, and the lock configuration 710 to the transponder in the sequence shown in FIG. 9. Steps in the process shown in FIG. 9 that are common to the process shown in FIG. 8 have like labels, advanced by 100. E.g., in FIG. 8 the process starts at 601, in FIG. 9 the process starts at 701. When programming, the configuration and telegram write orders can be interchanged.

In summary, this specification describes means for manufacturers to produce ISO 11784/11785 compliant transponders with authentication signature using commonly available transponders and RFID programmers. This specification also describes a method to validate the authentication signature using RFID scanners with transponder programming features.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall there between.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

What is claimed is:

1. A radio frequency identification (RFID) transponder, comprising:
 a radio frequency (RF) transceiver; and
 memory in communication with the RF transceiver, the memory storing data retrievable by a scanner via the RF transceiver, the memory being programmed according to ISO 11784/11785 code structures and comprising:
 (i) read-only memory comprising:
  a unique identification (UID) code unique to the transponder, wherein the RFID transponder is programmed to transmit the UID code upon receiving a memory-read signal by the transponder; and
  a read-only signature that is a first portion of a signature;
 (ii) field-programmable memory comprising a default RFID telegram comprising a sequence of data continuously transmitted by the transponder automatically upon activation of the transponder by the scanner, the default RFID telegram comprising an identification code and a signature indicator, wherein the default RFID telegram further comprises an encrypted signature generated by encrypting a second portion of the signature using a public-private key encryption scheme,
 wherein the RFID transponder is programmed to:
  transmit the read-only signature upon receipt of the memory-read signal by the transponder, and
  transmit the encrypted signature upon the activation of the transponder, wherein the RFID transponder is compliant with ISO 11784/11785 code structures.

2. A passive integrated transponder (PIT) tag comprising the transponder of claim 1.

3. A collar tag comprising the transponder of claim 1.

4. A method performed by a scanner for validating a radio frequency identification (RFID) transponder, the RFID transponder comprising memory storing data retrievable by the scanner, the memory comprising read-only memory comprising a unique identification (UID) code unique to the transponder and a read-only signature that is a first portion of a signature, the data comprising a default RFID telegram comprising an identification code and a signature indicator wherein the default RFID telegram further comprises an encrypted signature generated by encrypting a second portion of the signature using a public-private key encryption scheme, the method comprising:

retrieving, by the scanner, the default telegram by activation of the transponder with a radio frequency (RF) signal from the scanner, wherein the encrypted signature is retrieved with the default telegram;

retrieving the read-only signature by transmitting a memory-read signal from the scanner to the transponder; and computationally authenticating, by the scanner, the signature based on the default telegram, wherein computationally authenticating the signature comprises validating the signature using a public key, the default telegram, and the UID code, and wherein the RFID transponder is compliant with ISO 11784/11785 code structures.

5. The method of claim 4, wherein the UID is code independently established by a third party and the method further comprises retrieving the UID code by transmitting the memory-read signal from the scanner to the transponder.

6. The method of claim 4, wherein the memory-read signal is transmitted by the scanner after retrieving the default telegram.

7. The method of claim 6, wherein the scanner transmits the memory-read signal in response to confirming the signature indicator contained in the default telegram.

8. The method of claim 4, further comprising validating the transponder upon authentication of the encrypted signature.

9. The method of claim 4, wherein the transponder resides within an animal during retrieval of the default telegram and the encrypted signature.

10. The method of claim 9, further comprising identifying the animal after authenticating the encrypted signature.

11. A method performed by a scanner for validating a radio frequency identification (RFID) transponder, the RFID transponder comprising memory storing data retrievable by the scanner, the memory comprising read-only memory comprising a unique identification (UID) code unique to the transponder and a read-only signature that is a first portion of a signature, the data comprising a default RFID telegram comprising an identification code and a signature indicator wherein the default RFID telegram further comprises an encrypted signature generated by encrypting a second portion of the signature using a public-private key encryption scheme, the method comprising:

retrieving, by the scanner, the default telegram by activation of the transponder with a radio frequency (RF) signal from the scanner, wherein the encrypted signature is retrieved with the default telegram;

retrieving the read-only signature by transmitting a memory-read signal from the scanner to the transponder; and computationally authenticating, by the scanner, the signature based on the default telegram, wherein computationally authenticating the signature comprises validating the signature using a public key, the default telegram, and the UID code, and wherein the RFID transponder is compliant with ISO 11784/11785 code structures, wherein the memory-read signal is transmitted by the scanner after retrieving the default telegram, wherein the scanner transmits the memory-read signal in response to confirming the signature indicator contained in the default telegram.

12. The method of claim 11, further comprising validating the transponder upon authentication of the encrypted signature.

13. The method of claim 11, wherein the transponder resides within an animal during retrieval of the default telegram and the encrypted signature.

14. The method of claim 13, further comprising identifying the animal after authenticating the encrypted signature.

* * * * *